United States Patent [19]

Arden et al.

[11] 4,436,024

[45] Mar. 13, 1984

[54] FIREPLACE ROTISSERIE

[76] Inventors: Terry D. Arden, 5009 Lunow, Oklahoma City, Okla. 73135; Robert M. Foglesong, 3115 Del View, Del City, Okla. 73115

[21] Appl. No.: 334,415

[22] Filed: Dec. 24, 1981

[51] Int. Cl.³ .............................................. A47J 37/04
[52] U.S. Cl. ................................. 99/421 HV; 99/427; 126/137; 248/124
[58] Field of Search .................... 126/137, 25 AA, 30, 126/9 B, 9 R, 14, 41 R, 41 B, 41 C; 99/421 H, 421 HV, 421 HH, 427; 248/124, 413, 222.4, 644, 287

[56] References Cited

U.S. PATENT DOCUMENTS

| 693,127 | 2/1902 | Gardner et al. | 248/222.4 X |
|---|---|---|---|
| 997,699 | 7/1911 | Rains | 248/413 |
| 2,344,425 | 3/1944 | Snyder | 343/901 |
| 2,649,042 | 8/1953 | Wickman | 99/441 |
| 3,387,555 | 6/1968 | Moran | 99/421 HV |
| 4,158,992 | 6/1979 | Malafouris | 99/421 HV |

FOREIGN PATENT DOCUMENTS 375863 4/1964 Switzerland .................. 99/421 HH

Primary Examiner—Samuel Scott
Assistant Examiner—Kenichi Okuno
Attorney, Agent, or Firm—Robert K. Rhea

[57] ABSTRACT

A spit is vertically adjustably supported at one end by horizontal coaxial tubular members and a vertically adjustable standard on a fireplace hearth. The other end of the spit is removably inserted into apertures formed in a post secured to the back wall of a fireplace for horizontally supporting the spit. A crank handle, having a set screw equipped hub, surrounds the end of the tubular members opposite the fireplace back wall permitting manual or rotisserie motor drive for the spit.

4 Claims, 3 Drawing Figures

FIREPLACE ROTISSERIE

BACKGROUND OF THE INVENTION

1. Field of the Invention

The present invention relates to rotisseries and more particulary to a manually or motor operated rotisserie for a fireplace.

2. Description of the Prior Art

The most pertinent prior patent is believed to be U.S. Pat. No. 2,649,042 which discloses an elongated rod manually held at one end and rotated by a handle with its other end pointed and inserted into a fireplace back wall stone or brick crevice for journalling the rod. Food supporting members are secured to the rod over the position of the fire or coals.

This invention utilizes the back wall of a fireplace to which a support is secured for selective vertical adjustment of the fireplace supported end of a spit and includes a vertically adjustable stand at the control end of the spit which is provided with a combination handle and/or motor drive arrangement for angular rotation of the spit.

SUMMARY OF THE INVENTION

A vertically adjustable base supported stand is disposed on the hearth of a fireplace. The upper end of the stand horizontally supports coaxial tubular members with the inner tube supporting one end portion of a spit which projects at its other end portion into the fireplace above an open fire or coals and is vertically adjustably supported by a post vertically secured to the back wall surface of the fireplace. The other end of the tubular members is provided with a crank-type handle means including a coaxial hub. A drive rod, secured to the end of the inner tube opposite the spit, projects axially outward from the hub. Set screw means, supported by the hub, are selectively engagable with the drive rod for manual rotation of the spit by the handle or anchoring the crank handle to the adjacent end of the outer tube for forming a stop contacting an outer wall surface of a conventional rotisserie driving motor drivably mounted on the drive rod.

The principal object of this invention is to provide a portable cooking device for a fireplace including a spit which may be selectively disposed vertically above an open fire or coals in the fireplace and be selectively manually rotated or motor driven for cooking food supported by the spit.

DESCRIPTION OF THE PREFERRED EMBODIMENT

Figure 1:
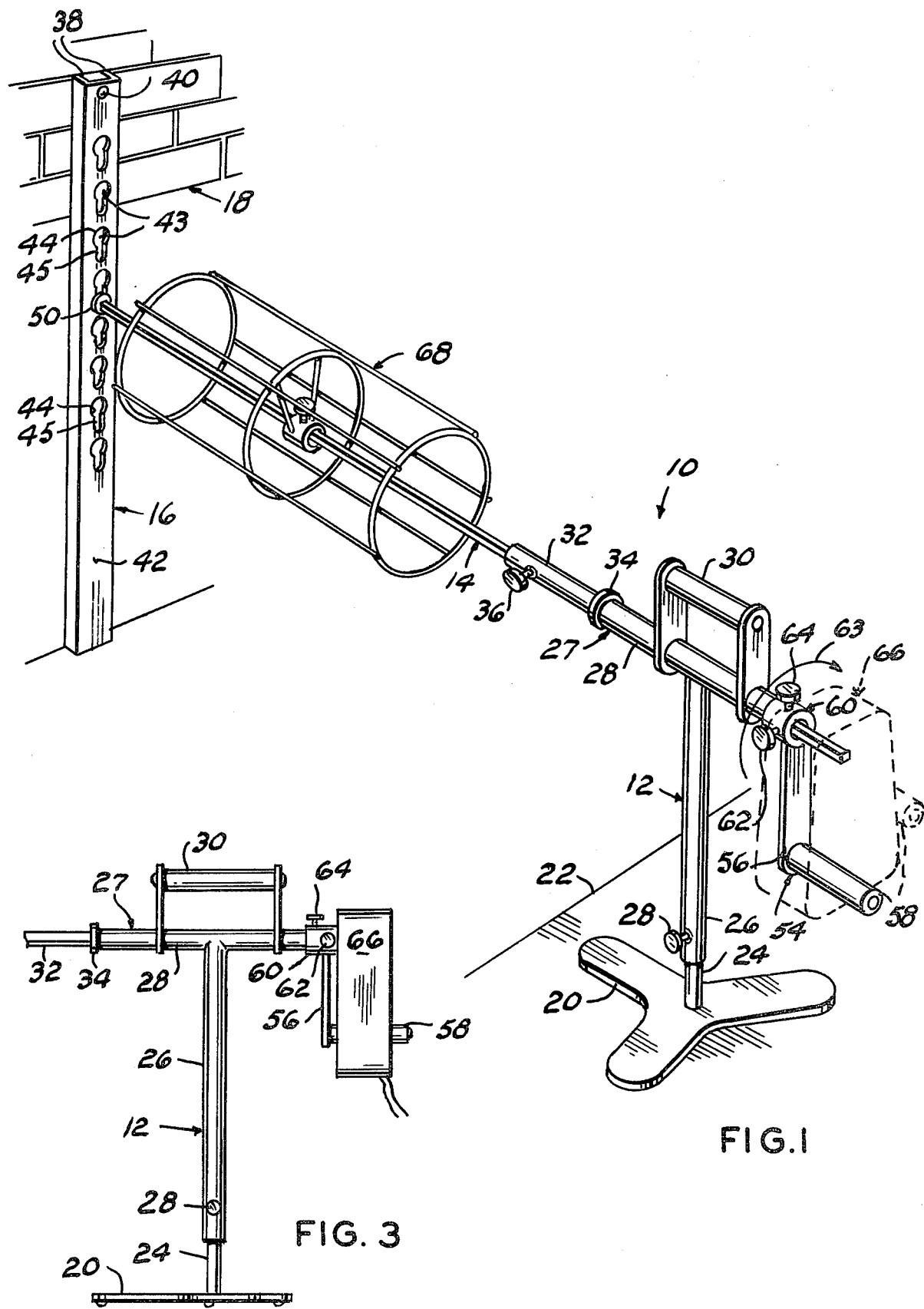
FIG. 1 is a perspective view of the device illustrating, by dotted lines, the relative position of a rotisserie motor when connected therewith.
Figure 2:
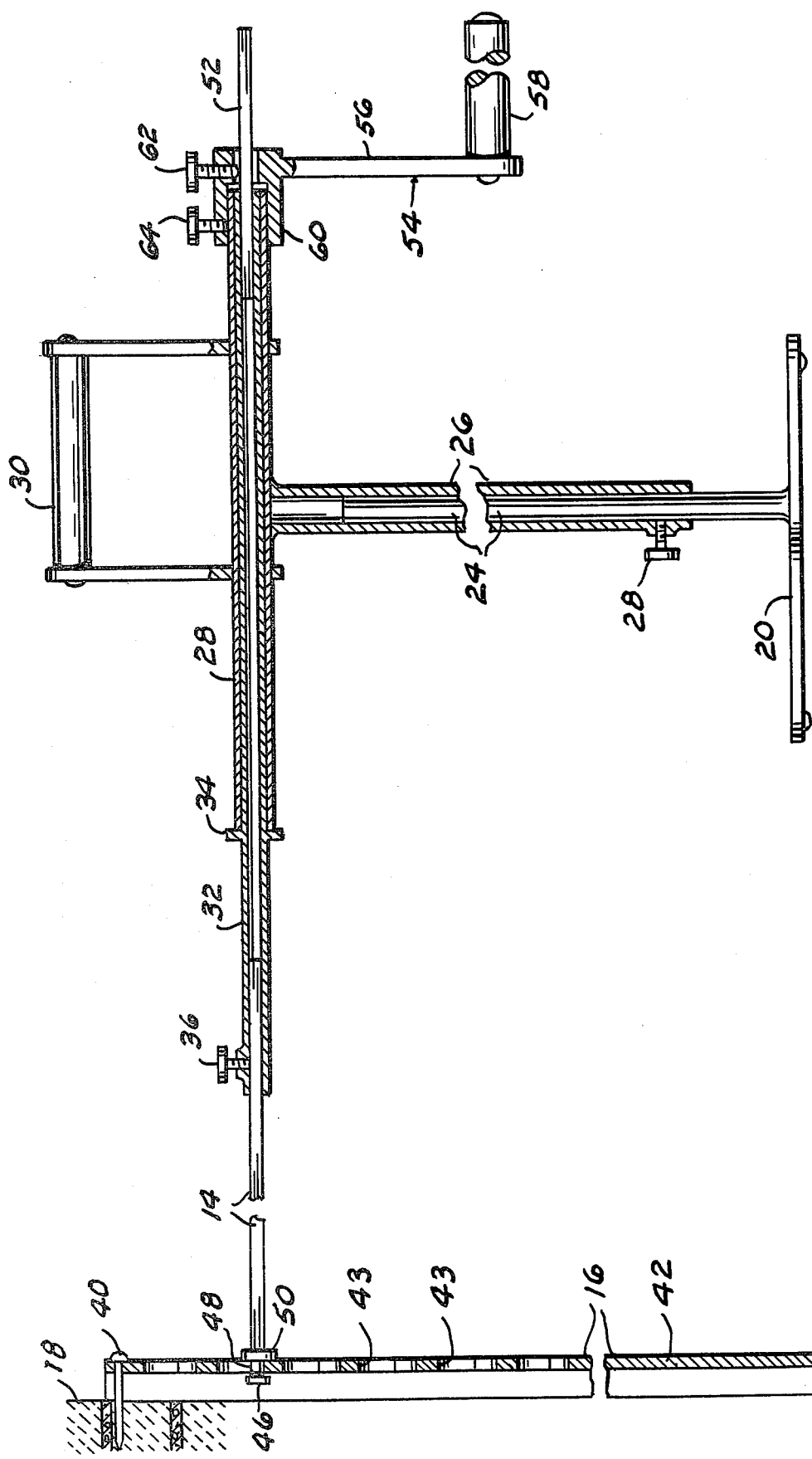
FIG. 2 is a fragmentary vertical cross sectional view, to a different scale, of the device in operative position; and, FIG. 3 is a fragmentary side elevational view, to another scale, of the standard illustrating a rotisserie motor mounted thereon.

Like characters of reference designate like parts in those figures of the drawings in which they occur.

In the drawings:

The reference numeral 10 represents the cookiing device, as a whole, comprising a vertically adjustable standard 12 supporting one end of a spit 14 and a post 16 secured to a fireplace back wall 18 for supporting the other end of the spit. The standard means 12 comprises a horizontal base 20 disposed on a fireplace hearth 22, or the like. A tube 24 is centrally secured to the base 20 in upstanding relation and telescopically receives thereover an outer tube 26 provided with a set screw 28 for vertical adjustment of the tube 26 relative to the tube 24. The upper end of the standard tube 26 is rigidly secured to concentric horizontal tubular means 27 intermediate its ends. A lifting handle 30 is rigidly secured to the outer tube 28 in upstanding relation for transporting the device 10. The inner tube 32, freely journalled by the outer tube 28, projects at one end portion beyond the outer tube toward the fireplace back wall. An outstanding flange 34, surrounding the inner tube, abuts the fireplace back wall directed end surface of the outer tube 28.

The spit 14 is preferably square in cross section and is coaxially received slidably at one end portion within the inner tube 32 and secured therein by a set screw 36 for angular rotation of the spit, as presently explained. The inner tube contained end portion of the spit may be sharpened to a point, if desired, for inserting it through food.

The post 16 is preferably formed from channel material with the legs 38 of the channel contacting the adjacent surface of the stone or brick 18 forming the back wall of the fireplace. The depending end of the post 16 rests on the base or floor of the fireplace and its upper or top end is secured to the fireplace wall by a suitable fastener 40 extending through the bight surface 42 of the channel. The channel bight surface 42 is provided with a plurality of vertically equally spaced keyhole-like apertures 43 for receiving and journalling the end of the spit 14 opposite the standard means 12. The keyholes are characterized by an upper partcircular portion 44 communicating with a depending vertical slot portion 45. The post supported end of the spit is characterized by a disk 46 secured to its end surface normal to the longitudinal axis of the spit and dimensioned to freely enter the larger circular portion 44 of the respective keyhole aperture 43. Adjacent the disk 46, the spit is provided with a circular surface, as at 48, for angular rotation in the keyhole slot portion 45. A flange or ring 50, diametrically greater than the circular portion 44, spaced from the disk 46 a distance at least equal to the thickness of the channel post bight portion 42, surrounds the spit 14 as a guide for the spit and prevents axial movement of the spit relative to the channel or post during angular rotation of the spit. A length of drive rod 52, preferably square in transverse section, is secured at one end portion in the other end portion of the inner tube 32 and projects axially outward opposite the fireplace wall beyond the end of the tubular means 27.

Handle means 54 is disposed at the end of the tubular means 27 opposite the fireplace wall 18 and comprises a crank arm 56 having handle 58 at one end and an internal step diameter hub 60 at its other end. The larger inner diameter of the hub 60 surrounds the adjacent end portion of the outer tube 28 and the hub smaller inner diameter surrounds an intermediate portion of the drive rod 52.

Set screw means, supported by the hub, comprises a first set screw 62 which may be tightened to secure the hub to the drive rod 52 so that when the handle 58 is angularly rotated about the axis of the drive rod and spit, as in the direction of the arrow 63, the drive rod rotates the inner tube 32 and spit 14 with the hub rotating relative to the outer tube 28.

The set screw means further comprises a second set screw 64 which is utilized to anchor the hub 60 to the outer tube 28. A conventional rotisserie motor 66 may then be connected with the outwardly projecting end portion of the drive rod 52 after loosening the first set screw 62 from contact with the drive rod so that the motor 66 will angularly rotate the drive rod, inner tube 32 and spit 14. Anchoring the hub 60 to the outer tube 28, by the set screw 64 is for the purpose of enabling the handle means 54 to form a stop in which the handle 58 is contacted by an outer wall surface of the motor 66, as illustrated by dotted lins (FIG. 1), to prevent angular rotation of the motor 66 about the axis of the drive rod and insure that the motor rotates the drive rod and spit.

As illustrated by FIG. 1, the spit may be provided with conventional food holding containers, such as the wire rack 68, a screen wire enclosed basket or confronting food penetrating tines, neither of which are shown.

OPERATION

The operation of the cooking device seems obvious from the above description except for the placement and removal of the device 10 in and from the fireplace. The food, not shown is initially secured to the spit by placing it in the basket or other means and the device manually disposed in the fireplace as by lifting it by the handles 30 and 58 wherein the spit disk 46 is inserted into a selected one of the keyholes 44 and the standard means 12 adjusted for horizontal disposition of the spit.

Removal of the device and food from the fireplace is accomplished by lifting the handle 30 while pressing downwardly on the handle 58 to balance the device and food and to remove the spit disk 46 from the post aperture.

Obviously the invention is susceptible to changes or alterations without defeating its practicability. Therefore, we do not wish to be confined to the preferred embodiment shown in the drawings and described herein.

We claim:

1. A portable device for cooking over an open fire in a fireplace, said fireplace having a back wall, comprising:
    a base;
    vertically adjustable standard means supported by said base;
    tubular means horizontally supported by said standard means;
    a post vertically secured to said back wall,
        said post having a plurality of vertically spaced apertures;
    a spit extending between and supported at its respective end portions by said tubular means and said post;
    a drive rod coaxially secured to said tubular means opposite said spit;
    handle means including a hub having internal step diameters respectively surrounding the drive rod equipped end portion of said tubular means and an adjacent intermediate portion of said drive rod;
    set screw means including first and second set screws on said hub for selectively securing said hub to said drive rod for manual angular rotation of the drive rod or rigidly securing said hub to said tubular means; and,
    a rotisserie motor drivably connected with said drive rod,
        whereby said handle means forms a stop when rigidly securred to said tubular means for preventing angular rotation of said rotisserie motor as a unit about the axis of said drive rod.

2. The cooking device according to claim 1 in which said post comprises:
    an elongated channel having a bight portion and having its legs facing said back wall,
        said post apertures being substantially keyhole-shaped and disposed in the bight portion of said channel; and further including:
    disk and flange means for maintaining one end portion of said spit within a selected one of the apertures.

3. The cooking device according to claim 2 in which said disk and flange means comprises:
    a disk coaxially secured to said one end portion of said spit, said disk dimensioned for entering the keyholes; and
    an outstanding flange secured to said spit in spaced relation with respect to said disk for preventing axial movement of said spit relative to said channel bight portion.

4. The cooking device according to claim 3 in which said tubular means comprises:
    an outer tube secured to said standard means;
    an inner tube coextensive with and journalled by said outer tube; and,
    other set screw means coaxially securing the other end portion of said spit within said inner tube.

* * * * *